United States Patent [19]
Noble et al.

[11] Patent Number: 5,235,176
[45] Date of Patent: Aug. 10, 1993

[54] OPTICAL RADIATION SENSING ASSEMBLY WITH INCREASED RESOLUTION

[75] Inventors: Milton L. Noble, Liverpool; John M. Swab, Baldwinsville, both of N.Y.; Albert F. Milton, Washington, D.C.

[73] Assignee: General Electric Company, Philadelphia, Pa.

[21] Appl. No.: 923,869

[22] Filed: Jul. 30, 1992

[51] Int. Cl.$^5$ .................................. H01J 40/14
[52] U.S. Cl. ........................... 250/208.2; 250/370.08
[58] Field of Search ............... 250/208.2, 208.4, 206.1, 250/231.1, 574, 578.1, 370.08, 370.11, 370.09; 358/113

[56] References Cited

U.S. PATENT DOCUMENTS

| | | | |
|---|---|---|---|
| 4,659,928 | 4/1987 | Tew | 250/370.08 |
| 4,670,653 | 6/1987 | McConkle et al. | 250/370.08 |
| 4,810,881 | 3/1989 | Berger et al. | 250/370.11 |
| 5,023,455 | 6/1991 | Vanstraelen | 250/370.08 |

Primary Examiner—David C. Nelms
Assistant Examiner—Que T. Le
Attorney, Agent, or Firm—Geoffrey H. Krauss

[57] ABSTRACT

A high-resolution radiation detector cell array has a planar substrate, with multiple switching circuits, interposed between a detector substrate and a subsequent substrate containing high-sensitivity preamplifiers; each of the middle-substrate switching circuits operates to substantially continuously connect cyclic different ones of an assigned different set of the array cells to an associated single one of multiple preamplifiers. In a N×M array of cells used with a C column-by-R row switching subassembly, a total array of (N/C)×(M/R) preamplifiers are needed. The generally-planar detector, switch and preamplifier substrates can be connected using metallic "bump" contacts; the switch layer material may be selected to have a CTE between the CTEs of the detector and preamplifier layers.

10 Claims, 3 Drawing Sheets

OPTICAL RADIATION SENSING ASSEMBLY WITH INCREASED RESOLUTION

BACKGROUND OF THE INVENTION

The present invention relates to optical radiation detection arrays and, more particularly, to a novel higher-resolution radiation detector assembly with a switching means interposed between a detector cell array substrate and a subsequent substrate containing high-sensitivity preamplifiers, for substantially continuously connecting cyclic different ones of an assigned different set of the detector array cells to an associated single one of a plurality of preamplifier means.

It is now well known to detect the level of radiation incident upon each cell of a regularly-configured array of such cells, by conversion of the incident radiation directly to an electrical signal, which is then amplified in a relatively low noise preamplifier, to obtain a cell output signal. Each preamplifier may have to operate on the electrical output of more than one portion of the detector, especially where the FPA contains a large number of cells; such as FPA is generally of a planar rectangular N×M configuration (i.e. with a first plurality N of cells arranged with regular spacing in a first direction and another plurality M of cells spaced in regular fashion in a second direction substantially orthogonal to the first direction). The preamplifier circuit following each group of cells is of relative high complexity to provide for the required low-noise cell readout. These complex preamplifier cells generally have a cell, or picture element (pixel), size which is relatively constant, as the preamplifier input is always an electric signal even while large variations in incident optical radiation wavelength occur, and force some sort of concomitant variation in characteristics (e.g. the size) of each detector cell. As is also well known, the detector cell material may also be dependent upon the incident radiation characteristics, such as wavelength. For example, visible optical radiation is detectable with silicon FPA cells formed in a silicon substrate, engendering cell sizes much smaller than the FPA cells needed for conversion of incident infrared optical radiation, which may require much larger cell dimensions in IR-sensitive detector cell materials such as platinum silicide (PtSi), iridium silicide (IrSi), indium antimonide (InSb) or mercury cadmium telleride (HgCdTe, or MCT).

There are at least two presently-difficult-to-handle problems when increased infrared FPA resolution (increased number of pixels along either dimension of the detector array) is attempted: first, there is a practical limit to the present size of a generally planar detector FPA when fabricated in many detection materials, so that attempts to increase resolution by simply making larger overall detector arrays of larger-size pixels will fail, due to this size limitation, while providing cells with smaller dimensions may require use of a material having a lower quantum efficiency (QE) and therefore less sensitivity; and, secondly, the selected detector array material will usually be different from the material in which the planar array of preamplifiers is fabricated, and the different materials will have different coefficients of temperature expansion (CTE), so that the effects of CTE mismatches between the detector and preamplifier arrays increase as the array size (and resolution) is increased. The radiation detector array materials are often relatively less robust than the silicon material utilized for the preamplifier array, and tolerate CTE mismatch stress less easily than the preamplifier substrates, so that relatively complex interconnection schemes between the conversion cells and their companion preamplifier are required, and are still subject to relatively easy degradation by higher mechanical stress levels.

It is therefore highly desirable to provide optical radiation detector arrays capable of higher resolution with simultaneous reduction of mechanical stress, particularly due to use over wide temperature range.

BRIEF SUMMARY OF THE INVENTION

In accordance with the invention, a novel high-resolution radiation detector cell array comprises a planar substrate, with a plurality of switching means, interposed between a detector substrate and a subsequent substrate containing high-sensitivity preamplifiers; each of the plurality of middle-substrate switching means operate to substantially continuously connect cyclic different ones of an assigned different set of the array cells to an associated single one of a plurality of preamplifier means. Thus, in a N×M array of conversion cells used with a C column-by-R row switching means array, a total array of (N/C)×(M/R) preamplifiers is needed. The generally-planar detector, switch and preamplifier substrates can be connected using metallic "bump" contacts; the switch layer material may be selected to have a CTE to mediate (i.e. be between) the CTEs of the detector and preamplifier layers.

A presently preferred embodiment of our novel high-resolution radiation detector cell array uses a generally planar MCT layer with 256×256 cells for IR detection, with a 64×64 array of 4:1 multiplexed preamplifiers on a silicon substrate, both sandwiching a 4:1 multiplexing switch means planar layer of GaAs therebetween.

Accordingly, it is an object of the present invention to provide a novel higher-resolution radiation detector assembly.

This and other objects of the present invention will become apparent to those skilled in the art upon reading the following detailed description of a presently preferred embodiment, when considered in conjunction with the associated drawings.

BRIEF DESCRIPTION OF THE DRAWINGS

FIG. 2b is a planar view of a section of the switching array, taken in the direction of arrows 2b—2b, in FIG. 2a.

DETAILED DESCRIPTION OF A PRESENTLY PREFERRED EMBODIMENT

Figure 1:
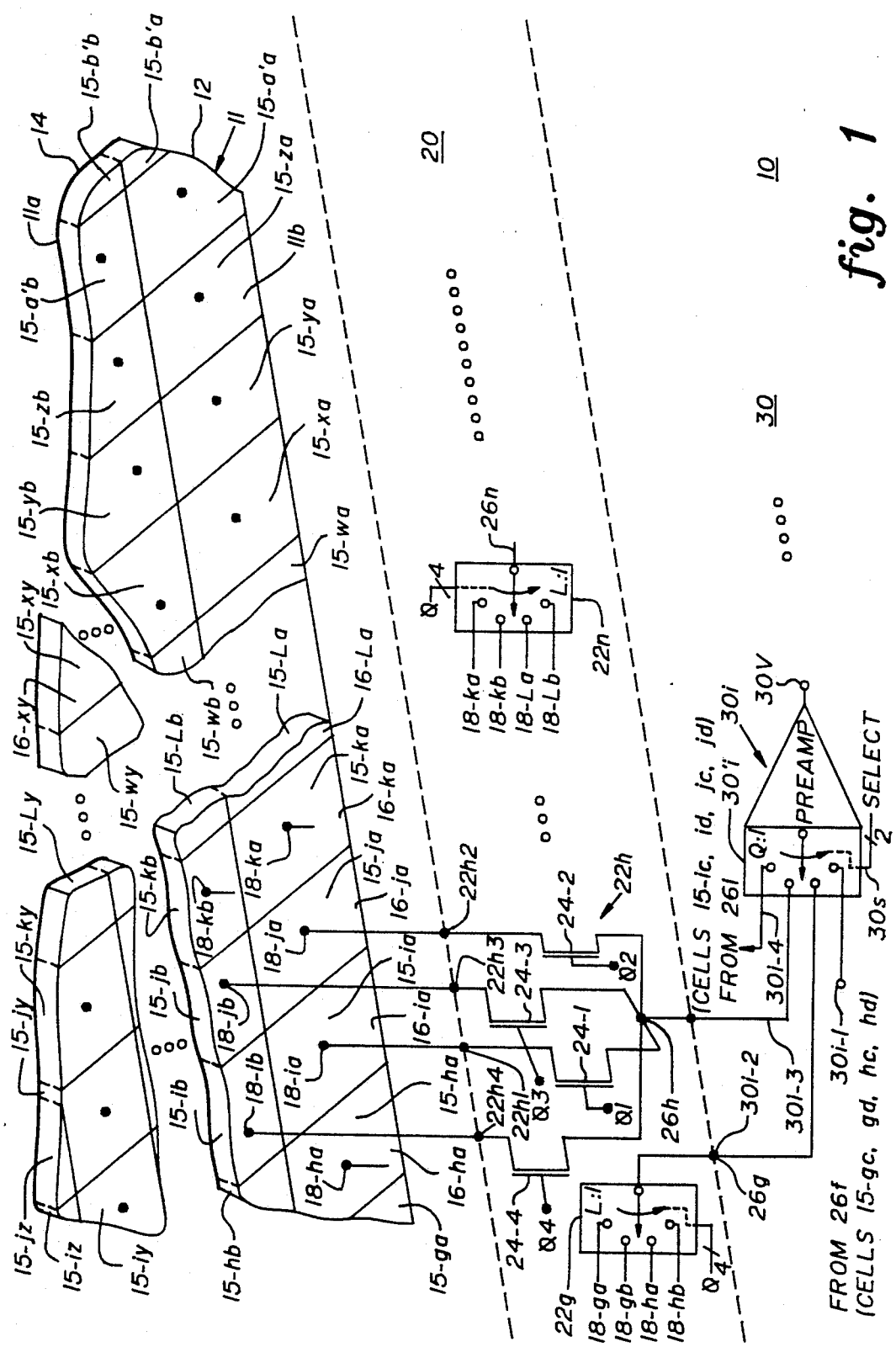
FIG. 1 is a partially schematic view of a higher-resolution optical radiation detector assembly in accordance with the principles of the preset invention.
Figure 1A:
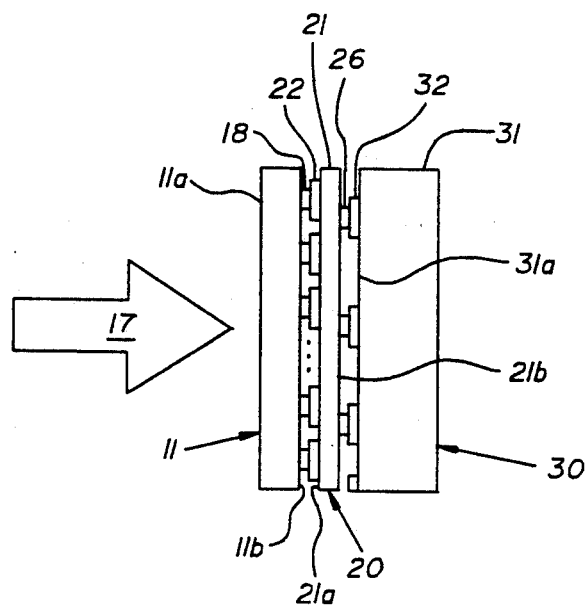
FIG. 1a is a side view of a detector array-switch array-preamplifier array "sandwich" in a detector assembly in accordance with the present invention.

Referring initially to FIGS. 1 and 1a, an optical radiation detector assembly 10 comprises an optical radiation detection focal plane array (FPA) 11 formed on a substrate 12 of a material selected to be responsive to the particular optical radiation wavelength(s) to be detected. The detector array 11 may be formed in a generally smooth form, although this does not imply that the detector array need be essentially, substantially or even generally, flat, but can be curved or even domed. A substantially-continuous common, or sheet, electrode 14 is applied to one surface 11a of the substrate, which is partitioned into a plurality of separate cells 15-$ij$, where i is the array column designator (e.g. columns g-l and w-b' in the associated detector array portion shown) and j is the array row designator (e.g. rows a-b and x-z in the FPA portion illustrated) and where $1 \leq i \leq N$ (with N being the maximum number of cellular columns in a first direction in the array) and $1 \leq j \leq M$ (with M being the maximum number of cellular rows in a second direction, say orthogonal to the first direction, in the array), by means of separate electrodes 16-$ij$ fabricated on the opposite substrate surface 11b from that surface 11a receiving the incident optical radiation 17. The plurality P, where $P = N \times M$, of individual cell electrodes 16-$ij$ may be fabricated of a material substantially opaque to the incident radiation, which is to be substantially absorbed by the layer 12 material and converted to an associated cell electrical signal at a cell output 18-$ij$. Present area (staring) arrays 11 of longwave infrared (LWIR) radiation detector cells 15 may provide each cell 15-$ij$ as a photovoltaic diode of an array of $N=256$-by-$M=256$, in a layer of a material such as InSb, with smaller arrays ($128 \times 128$ to $256 \times 256$) in MCT or larger arrays ($512 \times 512$) in less sensitive PtSi; large arrays in IrSi or GeSi substrates may also soon be possible. In LWIR arrays, operating on 8-12 $\mu$m optical radiation, a square cell may be as large as 4 milli-inches (mils) on each side. Detector arrays may be specially fabricated for a particular use, or may be purchased from one of the several commercial suppliers of such arrays, such as Amber Engineering, Inc. (Goleta, Ca.), the Santa Barbara Research subsidiary of Hughes Electronics, Texas Instruments, Rockwell, Cincinnati Electronics and the like firms.

A switching means array 20 is formed in a substrate 21 of a semiconductive material. The switching means array 20 has a lesser number $K < P$ of individual switch means 22$n$, where $1 \leq n \leq K$ and $K = P/R \times C$, with C being the number of cell columns (generally adjacent to one another) and R being the number of cell rows (also generally adjacent to one another) multiplexed by each of the K substantially identical switch means 22$n$. Thus, if each switch means, say means 22$h$, is a $L = RC$, say $C=2$-by-$R=2$, input-to-single output switch means, four separate inputs 22$h$1-22$h$4 are present, each connected to an input electrode, say the source electrode, of an associated solid-state switching device 24, say a FET formed in a semiconductor layer 21, such as a layer of Si, GaAs and the like. While a Si CMOS switching means array can be used, we prefer to use gallium arsenide to provide an improved CTE match to a MCT detector array, with respect to a Si preamplifier array; each of GaAsFETs 24-1 through 24-4 will receive a different switching signal $\phi 1$-$\phi 4$ at the associated control electrode, say the FET gate electrode, and has the remaining (drain) electrode connected to the switch output 26$h$. It will be seen that, here in the $2 \times 2$ switch means 22$h$, the first input 22$h$1 is connected to the cell 15-$ia$ output terminal 18-$ia$, while the second input 22$h$2 is connected to the cell 15-$ja$ output terminal 18-$ja$ and the third input 22$h$3 is connected to the cell 15-$jb$ output terminal 18-$jb$, while the fourth (and last) input 22$h$4 is connected to the output terminal 18-$ib$ of the cell 15-$ib$ completing a square subarray of 4 adjacent cells. Similarly, a previous switch means 20$g$ may have its individual inputs separately connected to the associated one of the outputs 18-$ga$, 18-$gb$, 18-$hb$ and 18-$ha$ of the immediately adjacent 4-cell square subarray, to be multiplexed to a single output 26$h$. Likewise, a subsequent, but non-adjacent $2 \times 2$ switch means 22$n$ can be connected to cell outputs 18-$ka$, 18-$kb$, 18-$lb$ and 18-$la$, for sequentially and cyclic switching of each input to the common output 26$n$ responsive to the cyclic presence of an associated one of the selection signals $\phi 1$-$\phi 4$.

A preamplifier array 30 is fabricated on a third substrate 31. Each means 30$i$ of the array may include an input multiplexer 30'$i$, allowing $A \times B = Q$ total inputs to be selectably connected for amplification; thus, the needed number of means 30$i$ would be ($P/Q \times L$). One typical preamplifier array (type AE138 available from Amber Engineering) is a $64 \times 64$ array of low-noise preamplifiers 30$i$, each with an $A = 2 \times 2 = B$ set of inputs 30$i$-1 through 30$i$-4 connectable for amplification at the output 30$v$, responsive to the $Q=4$ various states of a two-bit select signal at a select input 30$s$. If the first input 30$i$-1 is connectable to the output 26$f$ of a first switching means 20$f$ for selecting the output signals of cells 15-$gc$, 15-$hc$, 15-$hd$ and 15-$gd$, respectively responsive to the respective $\phi 1$, $\phi 2$, $\phi 3$ and $\phi 4$ signals, the second input 30$i$-2 may be connectable to the output 26$g$ of the switching means 20$g$ for selecting the output signals of cells 15-$ga$, 15-$ha$, 15-$hb$ and 15-$gb$, respectively responsive to the respective $\phi 1$-$\phi 4$ signals, then a third input 30$i$-3 can be connectable to switching means 22$h$ output 26$h$ to allow selection of the output signals of cells 15-$ia$, 15$ja$, 15-$jb$ and 15-$ib$, also respectively responsive to the respective $\phi 1$-$\phi 4$ signals, while the fourth input 30$i$-4 may be connectable to the output 26$i$ of another switching means 22$i$ for selecting the output signals of cells 15-$ic$, 15-$jc$, 15-$jd$ and 15-$id$, again responsive to the respective $\phi 1$-$\phi 4$ signals. Thus, a single preamplifier output 30$v$ will contain the supermultiplexed outputs of some $K \times Q = 16$ cells in time-shared manner, in this example. In general, if the preamplifier multiplexer 30'$i$ means allows selection of one of a plurality Q of input signals, than each channel output 30$v$ timeshares $T = L \times Q$ array cells 15. This allows each complex preamplifier means 30$i$ to occupy T times as much substrate array surface array as the surface 11$b$ array of each detector cell 15, if necessary. The three substrates 11, 21 and 31 can still be arranged in a sandwich (FIG. 1$a$) with the cell outputs 18 and switch outputs 26 being individually formed of metallic (say indium) "bump" formations which lie on the respective detector array back surface 11$b$ or switch means layer back surface 21$b$ and abut against aligned and associated conductive traces 22 and 32, respectively, on the input surfaces 21$a$ and 31$a$ of the respective switching means substrate 21 and preamplifier means substrate 31.

Figure 2A:
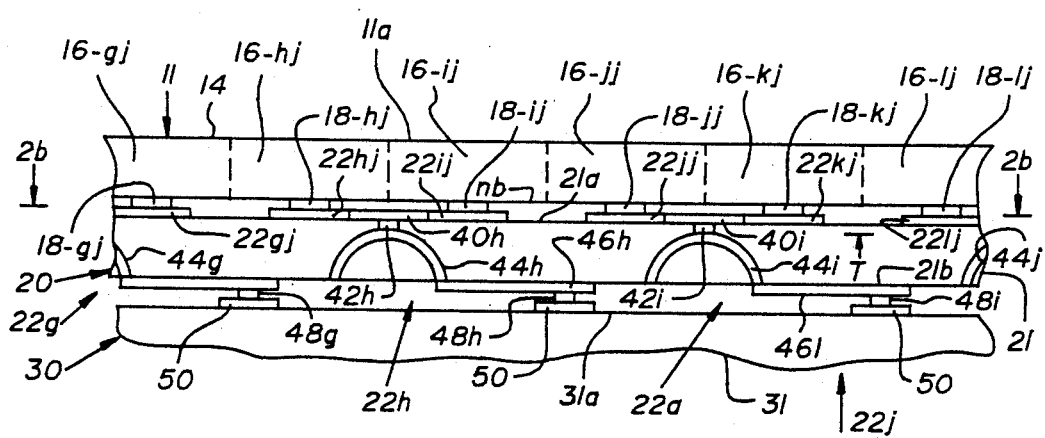
FIG. 2a is a side view of a section of the sandwich of FIG. 1a, illustrating the present invention in greater detail.
Figure 2B:
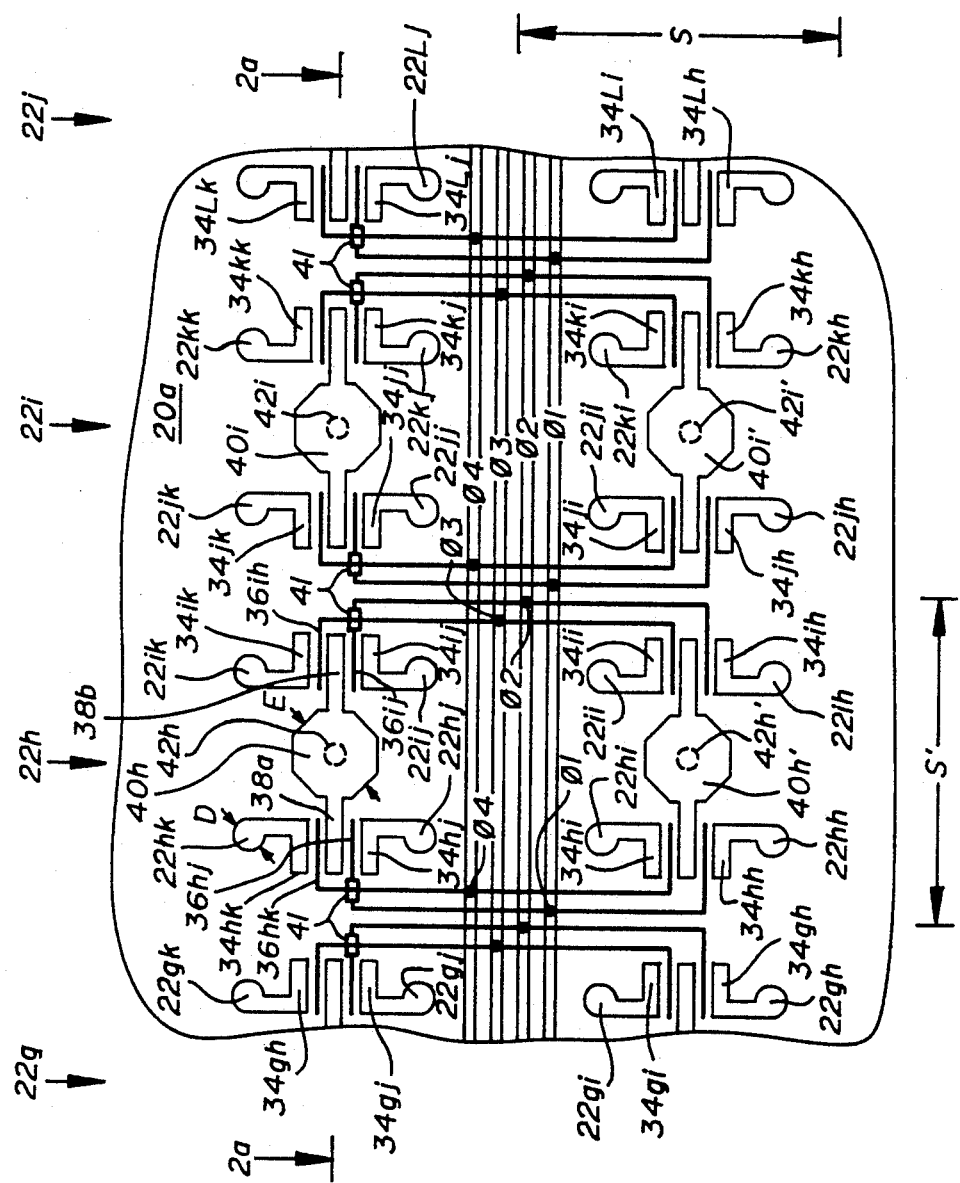

This contact method, as well as one presently preferred $2 \times 2$ switch means embodiment, is further illustrated in FIGS. 2$a$ and 2$b$. FIG. 2$a$ is a sectional view through the three substrates 11/21/31 along a line of cells 15-$xj$, for $g \leq x \leq 1$, in which each of the indium cell output contact bumps 18-$gj$ through 18-$lj$ is seen to be in pressured abutment against an associated switch means input pad 22$gj$-22$lj$. These latter pads are seen, by reference to FIG. 2$b$, to be part of a pattern covering an area of about S by S' (where preferably $S = S'$) and containing $R \times C$ (e.g. four, for $R = C = 2$) pads, say pads 22$hj$, 22$ij$, 22$ik$ and 22$hk$, of a switch means, say means 22$h$. Each pad may be roughly circular or may be roughly a regular polygon, and can have a major dimension (diameter) D of about ½ mil, when used with a switch means integrated circuit gallium arsenide (GaAs) substrate 20 with cell dimensions S=S'=2 mils, as may be configured for inclusion between a LWIR staring array 11 of higher (512×512) resolution, with detector cells of 1×1 mils square, for use with a 128×128 input preamplifier module 30, with all substrates having a common 0.512"×0.512" area. The switch means 22n commutates each group of four IR detectors to a different one of the multiplicity of preamplifier inputs. The switch means input pads, e.g. pads 22hj-22ik of means 22h, are each individually connected to an associated source metallization, e.g. sources 34hj-34ik. A gate electrode, e.g. gates 36hj-36ik (labeled only for switch means 22h), is interposed between the associated source electrode and a drain electrode portion, e.g. drain portions 38a and 38b (also shown only for means 22h), which connects to a switch means central portion 40, e.g. portion 40h, of dimension E on the order of 1 mil. Each gate electrode 36 is connected to the associated one of the φ1-φ4 drive lines; suitable isolation means 41 may be needed at conductive line crossovers. All of the foregoing metallization is fabricated upon the substrate surface 21a closest to the detector FPA 11. Prior to metallization, a generally thinned portion 41 is etched into the semiconductive substrate beneath the center portion 40; a via opening is formed, by selective etching, laser ablation and the like, through the remaining thin substrate region and, during metallization a conductive via 42, e.g. via 42h for switch means 22h, is formed between central portion 40 and a conductive dome portion 44, e.g. dome 44h in switch means 22h. The dome portion is integrally joined to a lower surface 21b contact portion 46, e.g. portion 46h in means 22h, having thereon an indium bump contact 48 (forming output 26) for abutment with an associated preamplifier input 32 contact pad 50 on the forward surface 31a of layer 31.

There has been described a higher-resolution radiation detector assembly having a switch means array sandwiched between a detector cell array and a preamplifier/multiplexer readout array. For highest resolution (largest) arrays of MCT or InSb IR detector cells, the switch substrate will preferably be of GaAs, which is a good CTE match to a silicon preamplifier substrate. Silicon switch means substrates can be used in small arrays. The switch means commutates L cells to each preamplifier input; a further "microscanning" of the detector can be provided by use of multiplexing of the Q different preamplifier inputs, for a total of L×Q scanning factor, which gives a reduction of the individual pixel duty cycle to 1/(L×Q), if used.

While several presently preferred embodiments have been described in detail herein, many modifications and variations will now occur to those skilled in the art. It is our intention, therefore, to be limited only by the scope of the appending claims and not by the specific details and instrumentalities present herein by way of example.

What we claim is:

1. An optical radiation sensing assembly, comprising:

means, formed on a substrate of a first material having a first coefficient of temperature expansion (CTE1), for converting radiation incident on each of an array of a first plurality P of cellular areas to an associated electrical output signal, with each of said P output signals being assigned into a different one of a second plurality L of sets each of a substantially equal number of different array output signals;

preamplifier means, formed on a separate substrate of a second material having a second coefficient of temperature expansion (CTE2), for providing an assembly output signal responsive to at least one preamplifier input signal; and switching means formed on another substrate of a third material having a third coefficient of temperature expansion (CTE3) selected to be between CTE1 and CTE2, with said another substrate being interposed and sandwiched between said converting means and said preamplifier means substrates, said switching means operating for substantially continuously cyclically connecting each different one of each set of array area outputs to an associated one preamplifier input.

2. The optical radiation sensing assembly of claim 1, wherein each of said converting, preamplifier and switching means substrates is formed of a different material.

3. The optical radiation sensing assembly of claim 2, wherein at least one of the converting and switching means has a bump formation formed upon a substrate surface to contact as associated formation formed upon an abutting surface of an adjacent substrate.

4. The optical radiation sensing assembly of claim 3, wherein the switching means comprises a another plurality K of switch means each having patterned conductors on opposite surfaces of the substrate, and a via connection through that substrate to interconnect the opposed conductor patterns of each switch means.

5. The optical radiation sensing assembly of claim 4, wherein the thickness of the switch means substrate is thinned in the vicinity of the via connection.

6. The optical radiation sensing assembly of claim 5, wherein each switch means comprises a plurality of individually controllable switching elements having separate control electrodes for controlling conduction from only one of a plurality of switch means inputs to a common output.

7. The optical radiation sensing assembly of claim 4, wherein each switch means has a plurality of input pads arranged around a common switch means output location.

8. The optical radiation sensing assembly of claim 7, wherein the input pads are arranged symmetrically about a via connection to an output pad.

9. The optical radiation sensing assembly of claim 1, wherein the switching means substrate is formed of a semiconductor material.

10. The optical radiation sensing assembly of claim 9, wherein the semiconductor material is one of silicon and GaAs.

* * * * *